US011727021B2

(12) United States Patent
Hill et al.

(10) Patent No.: US 11,727,021 B2
(45) Date of Patent: Aug. 15, 2023

(54) PROCESS CONTROL TOOL FOR PROCESSING BIG AND WIDE DATA

(71) Applicant: TIBCO Software Inc., Palo Alto, CA (US)

(72) Inventors: Thomas Hill, Tulsa, OK (US); David Katz, Ashland, OR (US); Piotr Smolinski, Munich (DE); Siva Ramalingam, Emeryville, CA (US); Steven Hillion, San Francisco, CA (US)

(*) Notice: Subject to any disclaimer, the term of this patent is extended or adjusted under 35 U.S.C. 154(b) by 53 days.

(21) Appl. No.: 16/352,608

(22) Filed: Mar. 13, 2019

(65) Prior Publication Data

US 2020/0192895 A1    Jun. 18, 2020

Related U.S. Application Data

(60) Provisional application No. 62/780,095, filed on Dec. 14, 2018.

(51) Int. Cl.

| G06F 16/00 | (2019.01) |
| G06F 16/2458 | (2019.01) |
| G06F 16/22 | (2019.01) |
| G06F 16/28 | (2019.01) |
| G05B 17/02 | (2006.01) |
| G06F 17/15 | (2006.01) |

(52) U.S. Cl.
CPC ......... *G06F 16/2465* (2019.01); *G05B 17/02* (2013.01); *G06F 16/2272* (2019.01); *G06F 16/2477* (2019.01); *G06F 16/287* (2019.01); *G06F 17/15* (2013.01)

(58) Field of Classification Search
CPC combination set(s) only.
See application file for complete search history.

(56) References Cited

U.S. PATENT DOCUMENTS

| 6,601,005 | B1 * | 7/2003 | Eryurek | G07C 3/00 |
| | | | | 73/861.357 |
| 10,459,932 | B2 * | 10/2019 | Naibo | G06F 16/2458 |
| 10,809,977 | B2 * | 10/2020 | Takeuchi | G06F 16/00 |

(Continued)

OTHER PUBLICATIONS

International search report and Written opinion issued in PCT application PCT/US2019/066386, dated Feb. 28, 2020.

*Primary Examiner* — Farhan M Syed (57) ABSTRACT

A process control tool for processing wide data from automated manufacturing operations. The tool including a feature selector, an analysis server, and a visualization engine. The feature selector receives process input data from at least one manufacturing process application, wherein the process input data includes a plurality of observations and associated variables, converts the received process input data to a stacked format having one row for each variable in each observation, converts identified categorical variables into numerical variables and identified time-series data into fixed numbers of intervals, computes statistics that measure the strengths of relationships between predictor values and an outcome variable, orders, filters, and pivots the predictor values. The analysis server performs at least one operation to identify interactions between predictor values, e.g. using maximum Likelihood computations or predefined searches, in the filtered predictor values. The visualization engine displays the interactions for use in managing the manufacturing operations.

20 Claims, 4 Drawing Sheets

(56) References Cited

U.S. PATENT DOCUMENTS

| | | | |
|---|---|---|---|
| 10,839,024 B2* | 11/2020 | Hill | G06F 16/283 |
| 11,157,782 B2* | 10/2021 | Bathen | G06N 3/084 |
| 2016/0085809 A1* | 3/2016 | de Castro Alves | G06F 16/24568 |
| | | | 707/736 |
| 2016/0179852 A1* | 6/2016 | Naibo | G06F 16/2465 |
| | | | 707/805 |
| 2017/0235657 A1* | 8/2017 | Goettge | G06F 11/3419 |
| | | | 707/740 |
| 2017/0243131 A1* | 8/2017 | Kephart | G06F 16/00 |
| 2017/0364590 A1* | 12/2017 | Hill | G06F 16/283 |
| 2018/0001184 A1* | 1/2018 | Tran | G16H 50/20 |
| 2018/0032068 A1* | 2/2018 | Higgins | B64F 5/60 |
| 2018/0046926 A1* | 2/2018 | Achin | G06N 20/20 |
| 2018/0121163 A1* | 5/2018 | Takeuchi | G06F 16/00 |
| 2018/0293462 A1* | 10/2018 | Ambati | G06F 16/86 |
| 2018/0316707 A1* | 11/2018 | Dodson | H04L 41/40 |
| 2019/0147300 A1* | 5/2019 | Bathen | G06N 3/045 |
| | | | 706/12 |

* cited by examiner

PROCESS CONTROL TOOL FOR PROCESSING BIG AND WIDE DATA

CROSS REFERENCE TO RELATED APPLICATION

This application claims priority to U.S. Provisional Patent Application No. 62/780,095, filed Dec. 14, 2018, entitled "System and Method for Selecting Important Parameters and Measurements in Wide Datasets," the entire contents of which are hereby fully incorporated herein by reference for all purposes.

TECHNICAL FIELD OF THE DISCLOSURE

The present disclosure relates, in general, to process control tools for manufacturing operations and, in particular, to a process control tool for discovering important parameters in big and wide data structures generated by complex manufacturing operations.

BACKGROUND

There are many specific use cases, best analytics practices, methods, and systems to address Big-Data requirements. However, available systems and software tools characterize Big-Data as having large numbers of logical rows or cases (units of analyses) with relatively fewer logical columns or variables. As a concrete example, typical customer transaction databases may contain millions or hundreds of millions of customers and transactions (the "rows" and units of analyses), where each logical row may only contain relatively few (e.g., a few hundreds or thousands of) characteristics or "variables," such as the dates of recent transactions, the products purchased, the amount of money spent, demographic information and other properties describing specific customers, and so on. For such data, existing methods for analytic modeling, clustering, or predictive modeling are well defined and mature, and these methods generally push the analytics to a cluster of computational nodes where the computations over the rows (customers) can be parallelized to satisfy performance requirements for the respective applications.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Data structures are characterized by the number of columns and rows, and frequently they contain extremely large numbers of columns and relatively few rows, although there often are also millions of rows. Such Big-and-Wide data structures do in fact occur with increasing frequency across various domains, but in particular in semiconductor manufacturing where tools and processes are extremely well instrumented. It is not uncommon that several millions of parameters can be aligned by lot, wafer, and die, describing the manufacturing process in detail over all processing steps. In general, in automated manufacturing there can be thousands of sensors and (e.g., electrical) test data parameters indexed by facility, machine or tool, and sensor. In addition, sensors may record temporospatial mappings of process conditions during a run; when such measurements are coded into the variables (columns) for each sensor, the dimensionality or width of the data further increases. These types of recordings create a large number of time series for each logical row (e.g., Lot/Wafer), thereby further increasing the dimensionality or width of the data with waveforms. Time series data can be aggregated to fixed numbers of elapsed time intervals across all rows, and the aggregate measurements can be added as predictor variables to subsequent analyses. This data preparation step performed for hundreds of time series can add significant numbers of predictor variables, further increasing the dimensionality or width of the data In addition to the problem of large-numbers-of-variables, data describing semiconductor manufacturing processes often involve discrete measurements with many unique labels. For example, lots of wafers are moved through large numbers of processing steps involving specific tools. When a large number of unique tools (with unique tool labels) process each individual lot, the resulting data will record the respective specific discrete label applied at each of a large number of processing steps. Because there are hundreds of tools (labels) used at each processing step, the problem of high cardinality in these discrete variables must be addressed. The high-cardinality-data problem is related to the Wide-and-Big data problem because discrete data are often recoded into multiple indicator columns (e.g., via one-hot or dummy-variable encoding), thereby adding further to the typically already large numbers of variables in the data.

A requirement for many applications is to perform useful root-cause analyses, predictive modeling, risk modeling, fault identification and classification, and yield-forecasting, etc., where analyses must be applied against big-and-wide data characterized by possibly millions of variables. The term modeling in this context refers to analytic goals and methods such as: (1) supervised learning for the purposes of building prediction models of some important outcomes (e.g., for reliability analysis, yield prediction, or root-cause analysis); (2) unsupervised learning for the purposes to identify structure in the rows and/or columns of the Big Data (e.g., clustering of rows, clustering of variables, clustering of states as defined by consecutive chunks of time series data); and/or (3) anomaly detection (e.g., the detection of unusual patterns across some, most, or all of the measured variables, with respect to "normal" patterns defined by the majority of the data).

These analyses typically require development of modeling pipelines, i.e., sequential processing steps arranged into a pipeline of such processing steps, in order to prepare, analyze, and report on the respective analytical problem. A specific problem here is that it is much harder to parallelize modeling pipelines for such data with millions of columns. It is impractical or impossible to move the data from an on-site storage location to a remote analysis-computing environment or fit the entire dataset into memory for computations. Currently, there are no commonly-accepted or out-of-the-box methods or systems available that can satisfactorily and efficiently solve the analytical challenges associated with Big-and-Wide data. Furthermore, any existing solutions designed to address Big data simply lack the capabilities to perform the modeling and analysis needed in real-time or near real-time to effectively solve operational problems in complex manufacturing scenarios where the time-delayed detection of abnormalities in the manufacturing process can result in the loss of product and time, and, therefore, money.

The system presented herein addresses the aforementioned issues and comprises two components that work in a distributed processing environment to efficiently perform analyses in sequence and/or asynchronously and a third visualization component to provide real-time or near real-time access to the data. In an embodiment, the first component of the two works close to the process data and after the process data is reduced to a smaller size the data can be moved to the second component where the data can be processed in a more efficient in-memory environment. That is, in this embodiment, the first component does the initial feature selection of predictors near the data; the second component takes the subset of selected predictors and performs additional processing (i.e., more intense processing), using efficient in-memory (or in-single-dedicated-computation-environment computations).

The first component is a multi-node parallel data processing system, such as Apache Hadoop® or Apache Spark™, where initial data preparation, feature selection, feature engineering, and other data aggregation, scaling, and other operations are performed to transform the Big and Wide Data into a stacked structure that can be processed and filtered more efficiently. It should be understood, however, that stacking the data is an optional step that is only performed when required. The result can be pivoted into a wide data set for subsequent processing. This component can benefit from technologies available for parallelized and optimized in-database (i.e., in-cluster) data processing, such as through TIBCO Spotfire® Data Science. Those steps are then followed by final model building and further model refinement on a dedicated analytics server where such computations can be performed rapidly in-memory, and with data that are now no longer Big Data. The computational overhead to arrange for parallelized in-database computations for such now-no-longer Big Data would make such computations inefficient, while sequencing the in-database big-data operations followed by on-server computations enables efficient continuous computations on both systems, for continuous operations. As a result, for example, when supporting root-cause analysis at semiconductor manufacturers, the application(s) can continuously perform data preparation and feature selection/extraction against (often petabytes of) data on their big-data platforms while the final computations of results are handed off to the dedicated computation server and visualization platform for final consumption of results. The third component is a visual exploration platform, such as TIBCO Spotfire®, that enables users to explore final results interactively, and thereby extract information of interest, based on the analyses of the Big-and-Wide data structures with possibly millions of input variables. Thus, the proposed system is efficient at allocating specific computational loads where they are best suited to be performed.

The system comprehensively describes an efficient and effective computer system for managing wide data that are also big. Big and Wide data require that some or most of the computations are performed close to the data (i.e., in-database), and with minimal movement of the data. The standard methods and algorithms to exclusively perform all computations in-database are not practical because they are typically optimized for large numbers of rows rather than columns. Therefore, the system combines specific analytic steps performed in-database and using parallelized computations, to select a subset of variables that are important for the specific analyses and analytic goals and use cases as previously described. The selected subset of variable can then be processed on the dedicated analysis servers in a very fast manner.

The system presented herein describes specific analytic approaches, workflows, and computational architectures that address Big and Wide data issues as well as the unique issues associated with analyzing very-high-dimensional data or data with discrete variables of very-high-cardinality (e.g., with thousands of distinct categories), in order to satisfy requirements for process monitoring and anomaly detection, predictive analytics and fault classification, and (automated) root-cause analysis. The system is designed to address specific issues with automated manufacturing applications, including semiconductor manufacturing, and enables an agile and highly interactive and visual analytics environment. The general approach also has applicability in many other domains where similar Big-and-Wide data and analytics problems arise.

Figure 1:
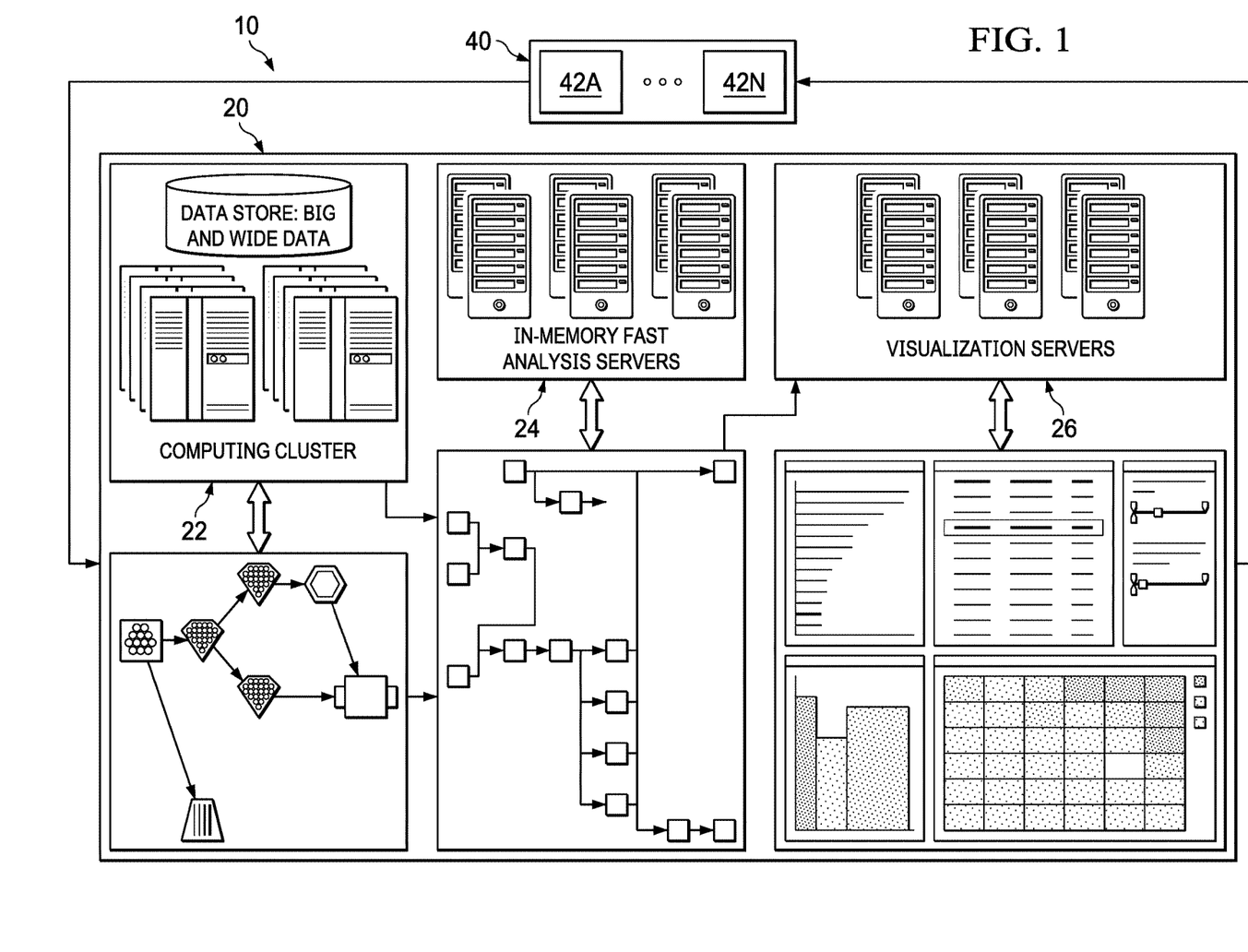
FIG. 1 is an illustration of a process control system for managing wide and big data generated from automated manufacturing operations, in accordance with certain example embodiments.

Referring now to FIG. 1, illustrated is a process control system for managing wide and big data generated from automated manufacturing operations, according to certain example embodiments, denoted generally as 10. The system 10 includes a process control tool 20 for processing data received from automated manufacturing operations 40 from at least one complex manufacturing application 42A-42N, such as semiconductor fabrication applications. Process control tool 20 includes a multi-stage data processing, transformation, and analysis system to render visualizations in real-time or near real-time that can have significant benefits for those managing production yields from these complex manufacturing operations. The process control tool 20 includes computing cluster (multi-node in-database system) 22, analysis server 24, and visualization server 26 for performing tasks such as data preparation, feature selection, multi-node in-database computations, model building, recursive application of feature selection, and parameter ranking in order to generate key process indicators from very large sets of process data for visualization of key process indicators. In an embodiment, the analysis server 24 can be an analysis server dedicated for performing functions defined herein.

Figure 2A:
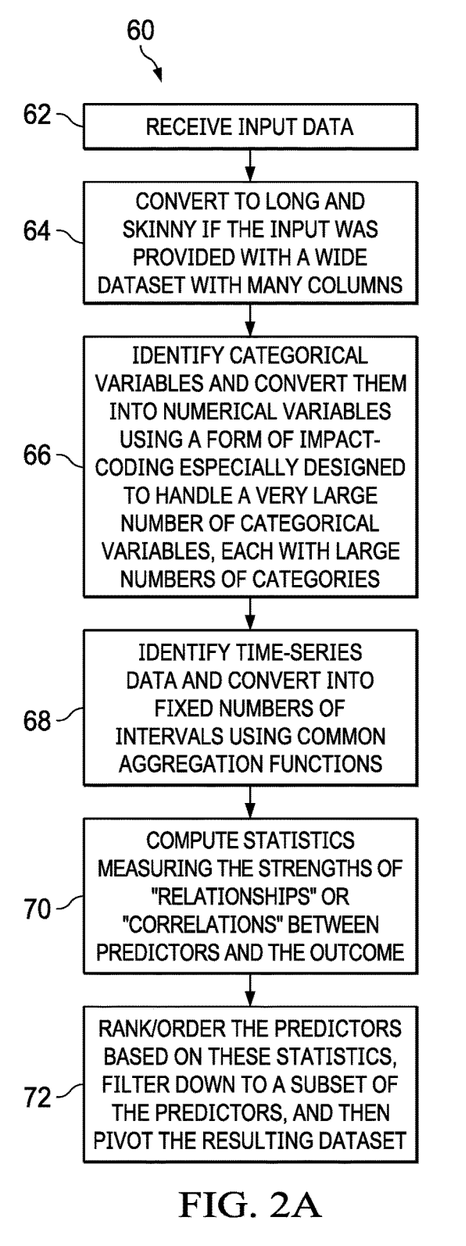
FIG. 2A and FIG. 2B are illustrations of flow charts for algorithms for feature selection, analysis, and visualization of a process control tool of the process system, in accordance with certain example embodiments.
Figure 2B:
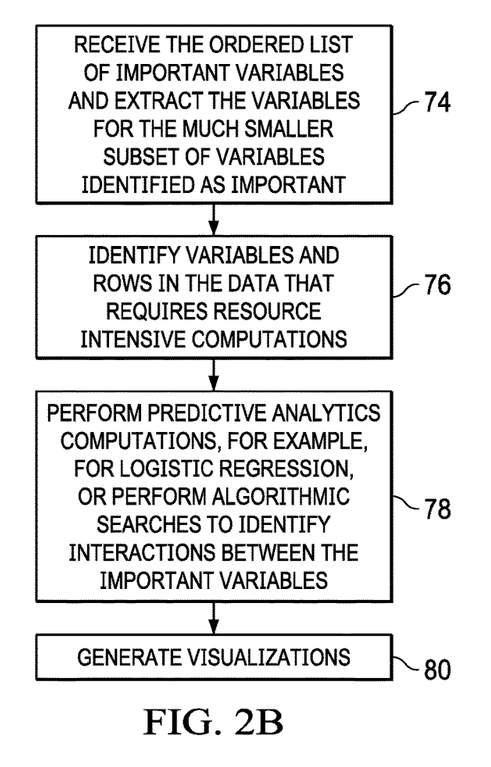

Referring now to FIG. 2A and 2B, illustrated are flow charts of a feature selection, analysis, and visualization algorithm of the process control tool 20, according to certain example embodiments, denoted generally as 60. The feature selection algorithm can use a number of algorithms that are specifically optimized for in-database parallelized execution to the data. Examples of such algorithms include the Spark Chi-square selector algorithm, the Boosted Trees algorithm, the Bagged Trees algorithm (Random Forests), and variable-by-variable breakpoint (segmented) regression algorithms. Specific analytic algorithms can be applied in these computations to ensure numeric stability of the required computations, for example by using centering constants during computations of means, standard deviations, and higher moments. The analysis and visualization algorithm includes further feature selection and model building executed using at least one dedicated analysis server, recursive application of feature selection and parameter ranking pipeline, and visualization of results.

FIG. 2A describes the feature selection algorithm and begins at block 62 and 64, where received process data (see FIG. 3 for process observations and measurement data 90) are prepared for in-database computations via the multi-node, multimode computations cluster 22. In this step, wide and big data stored in, for example, Hadoop® can be accessed for further processing. The process data can be logically arranged for efficient subsequent parallelized in-database processing. The data can be stacked, see FIG. 3, so that each logical row of the data describes (indexes) one data point (measurement) via a measurement ID (process observation ID), row ID, and actual measurement (process observation). The transformation enables efficient parallelization of feature selection methods in a multimode computational cluster 22, i.e. a computational cluster 22 for performing in-database computations. However, the data is only stacked if required.

Data access and correct structuring of the data is important in order to achieve the required performance when processing extremely wide data sets or wide and big data sets. For example, organizing the data by logical rows in a wide, unstacked data format where each row represents a unit of analysis, e.g., a wafer, and where the columns represent features or variables, e.g., measurements on the wafers, sensor traces associated with the manufacture of the wafers, is not efficient. This can be a serious and costly issue for complex manufacturing operations where the lack of access to real-time or near real-time process data can seriously affect operations.

At block 66, 68, 70, and 72, categorical (discrete, coded) process input variables can be automatically identified and coded using the impact-coding method. In essence, the discrete variables are converted to continuous predictors. Continuous predictor variables are not transformed by default, but users can choose to derive new predictor variables by applying one or more numeric transformation, such as square-root transformations, log-transformations, etc. Discrete predictors can be transformed into continuous predictors using the impact-coding method described in "Modeling Trick: Impact Coding of Categorical Variables with Many Levels." Win-Vector Blog, Jul. 23, 2012 by N. Zumel. However, what was not taught in Zumel was the implementation described in this disclosure wherein the data for each discrete predictor variable are randomly divided into two random samples. Averages (for continuous outcomes) or average frequencies (for categorical outcomes) are then computed for each category in the discrete predictor variable, separately for each sample. The discrete codes in each of the two random samples are then replaced by the averages computed from the data in the other sample, thus recoding all rows for the discrete predictor variables into continuous values. As a result, all discrete variables can be treated as continuous predictor variables in subsequent steps. Furthermore, the impact-coding method converts such input variables into single-column ranked data using cross validation techniques.

In addition, time-series input process data can be identified and converted into fixed numbers of intervals using common aggregation functions. For example, a SAX-style coding method can be used to create aggregate values for fixed number of time intervals, i.e., the same number of intervals for each series. SAX-style coding for time-series data (wave forms): The Symbolic Aggregate approXimation or SAX coding method has been demonstrated to be an effective technique for comparing time series patterns (wave forms) at scale in numerous applications. See, e.g., J. Lin, E. Keogh, L. Wei, and S. Lonardi. "Experiencing SAX: A Novel Symbolic Representation of Time Series." Data Mining and Knowldege Discovery, vol. 15, 2, p. 107-144, 2007. This holds true even when different time series contain patterns with slight time-shifts (representing identical patterns occurring at slightly different elapsed times), making it unnecessary to apply computationally expensive methods for reconciling time series, such as Dynamic Time Warping (DTW) algorithms. DTW can be used on the SAX-coded time-interval-based values as well, to achieve better alignment between series. In short, SAX coding can convert the consecutive observations in a time series by (a) aggregating values to a specific fixed number of time intervals, and (b) aggregating the time series values in the time intervals typically into letters or integers, or into other aggregate values such as but not limited to maximum or minimum values in each interval, to denote the respective average value as a multiple of the time-series standard deviations over the range of values for the time series. In addition, other common and emerging techniques for extracting vectors of numbers from time series can be applied to time series data, in order to align time series data with other discrete or continuous input variables.

The result of these computations is a list of variable importance (predictor) values for each variable in the wide data, i.e., a list of ordinal rankings by variable according to importance with respect to the specific analytics problem (clustering or unsupervised learning; predictive or supervised learning and root-cause analysis). That is, the result includes statistics measuring the strengths of relationships or correlations between predictor values and an outcome.

The feature selection algorithm of FIG. 2A includes different methods to determine variable importance by either computing simple linear R-squared values (correlations) between each input and the output or by computing more general statistics of association (relationship) between each input and the output. The former approach is faster, but may not capture highly nonlinear relationships between continuous variables. The second approach is based on robust (to outliers) Chi-square statistics computed for two-way frequency tables constructed from the binned values for each predictor and the binned or discrete output variables; this approach is computationally more expensive, but often more useful in order to detect non-linear and non-monotone relationships.

The algorithm can perform a first-order search through predictor variables; they will not specifically search for interactions between predictors in their effect on the outcome. As a practical matter, it is often the case that interaction effects exist in addition to main effects for the respective predictors, and in that case subsequent modeling and feature selection that explicitly searches for interaction effects, e.g., based on the Random Forest algorithm, can identify them. See E. Tuv, A. Borisov, G. Runger, and K. Torkkola, "Feature Selection with Ensembles, Artificial Variables, and Redundancy Elimination." Journal of Machine Learning Research, vol. 10, 2009, 1341-1366. Also, in many practical applications in semiconductor manufacturing, identifying the specific groups of individual predictors (e.g., specific sensors) that are identified as important often provides the most diagnostic information about root causes and/or necessary preventive maintenance steps.

In addition, the predictor variables are ordered based on these statistics and filtered down to a subset of the predictor variables. The numbers of variables for which to extract data to create the subset can be controlled by the user of the system, or automatically determined (for fully automated operation) based on the overall importance values computed in the prior block. As a result of the analyses performed against the wide-and-big data using an efficient parallel computing environment close to the data—for example, Spark™—a subset of "important" predictors is identified, i.e., predictors that are diagnostic with respect to the outcome of interest. For example, the analysis can identify from among millions of predictors and sensor wave data those specific predictors and sensor traces that differentiate between normal and abnormal wafers or specific failure modes. Once a smaller subset of such important variables has been identified, further analyses and modeling can be performed in a dedicated analysis server. Further, those computations can happen asynchronously with respect to the computations performed in the in-database parallelized computing environment, so that the in-database computations can be applied to newly arriving data while the second in-memory analytic phase is progressing at the same time.

Figure 3:
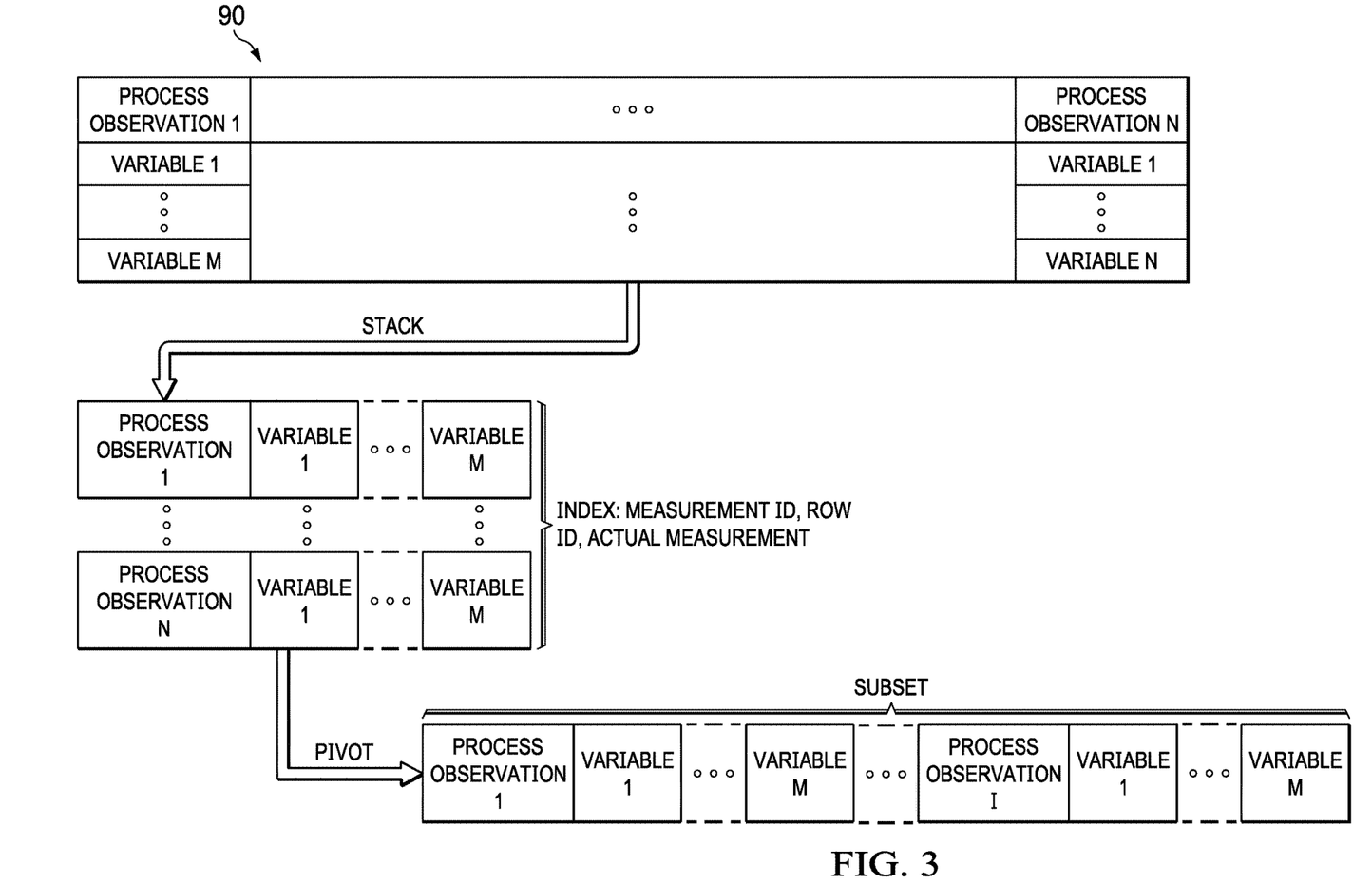
FIG. 3 is an illustration of Big and Wide data structure transformation, in accordance with certain example embodiments.

The resulting dataset of variables, i.e., the ordered list including the subset, is pivoted, see FIG. 3, and passed on to the analysis algorithm, FIG. 2B. When millions of predictors are organized in this manner, it is not possible to parallelize efficient feature selection, e.g., correlational, analyses. Instead, pivoting, unstacking, the data so that each row of the data identifies a wafer, parameter, time-stamp (for time series), and respective measurement value allows for much more efficient parallel processing downstream. However, when the subset of predictors are handed off to the In-Memory Fast Analysis Server 24, data are unstacked to the row (units-of-analyses) and columns (parameters) format, which is more efficient for many machine-learning algorithms.

In FIG. 2B, the analysis and visualization algorithm begins at block 74, where the pivoted subset of variables is received and the subset is extracted for further processing. Given the data for the selected subset of data, the dedicated analysis server or servers will then perform efficiently in-memory the final computations to complete a predictive model, clustering model, root-cause analysis, or anomaly detection. These computations can include various iterative algorithms commonly applied to such (now no longer Big) data, including but not limited to various regression algorithms (e.g., logistic regression), neural networks, deep-learning networks, or recursive partitioning algorithms including gradient boosted trees and treenets. The results of this model, including any prediction probabilities, values, or predicted classifications, or clustering assignments or distances, are then passed on to the visualization engine for display and exploration by the user.

At block 76, variables and rows in the data that require resource intensive computations are identified. At block 78, operations on the identified variables and rows are performed. Additionally, if the coded values associated with several time intervals belonging to specific sensor repeatedly and frequently are identified as important, e.g., using simple rules-based logic applied to the list of important predictors identified in previous steps, then the in-memory analytics server algorithm can query the original raw data associated with the respective sensor and send them downstream for interactive visualization. In this manner, meaningful waveform classification analyses with responsive interactive drill-down capabilities can be implemented even for very large datasets. Maximum-likelihood-estimation computations, for example, for Logistic Regression are performed and/or explicit, i.e., algorithmic, searches for interactions between the important variables are performed. The operations are performed in at least one of the in-memory, in-virtual-memory, and multithreaded computations. The operations are not parallelized and are completely independent computations. As an option, the analysis algorithm can be applied multiple times (recursively) until a suitable and desirable subset of important predictors or parameters are identified. At block 80, visualizations of the results are generated.

The visualization of results includes methods for rendering predicted classifications, prediction probabilities, cluster results, or related statistics reflecting on the quality and reliability and reproducibility of the respective analytic results. For example, a Pareto-like chart can be used to display the relative importance of the variables selected for the final model, along with confidence intervals for any parameter estimates, predicted values, cluster values, etc. In addition, box-and-whiskers plots can be rendered interactively by clicking on any of the boxes in the Pareto-like chart, to examine the specific nature of the relationships between variables and/or clusters, etc., depending on the specific analytic goals of the respective analysis. Another way by which results can be visualized is as networks of variables, where variables that not identified as important but that are significantly correlated (or just related) to the selected important predictors are shown as nodes in a network graph, connected via edges to the important variables. This graph therefore reveals the structure and clustering in predictor variables that were identified as important in the analyses, even if those variables were excluded from the final list of important variables because they were redundant.

The speed improvements on production-size Hadoop® clusters and Spark™ computing environments demonstrate that the system architecture and algorithms described herein enables efficient analyses of very wide logical datasets with millions of predictor variables, returning results within minutes when traditional approaches and analytic tooling either failed entirely, or required hours if not days before useful insights could be derived.

Figure 4:
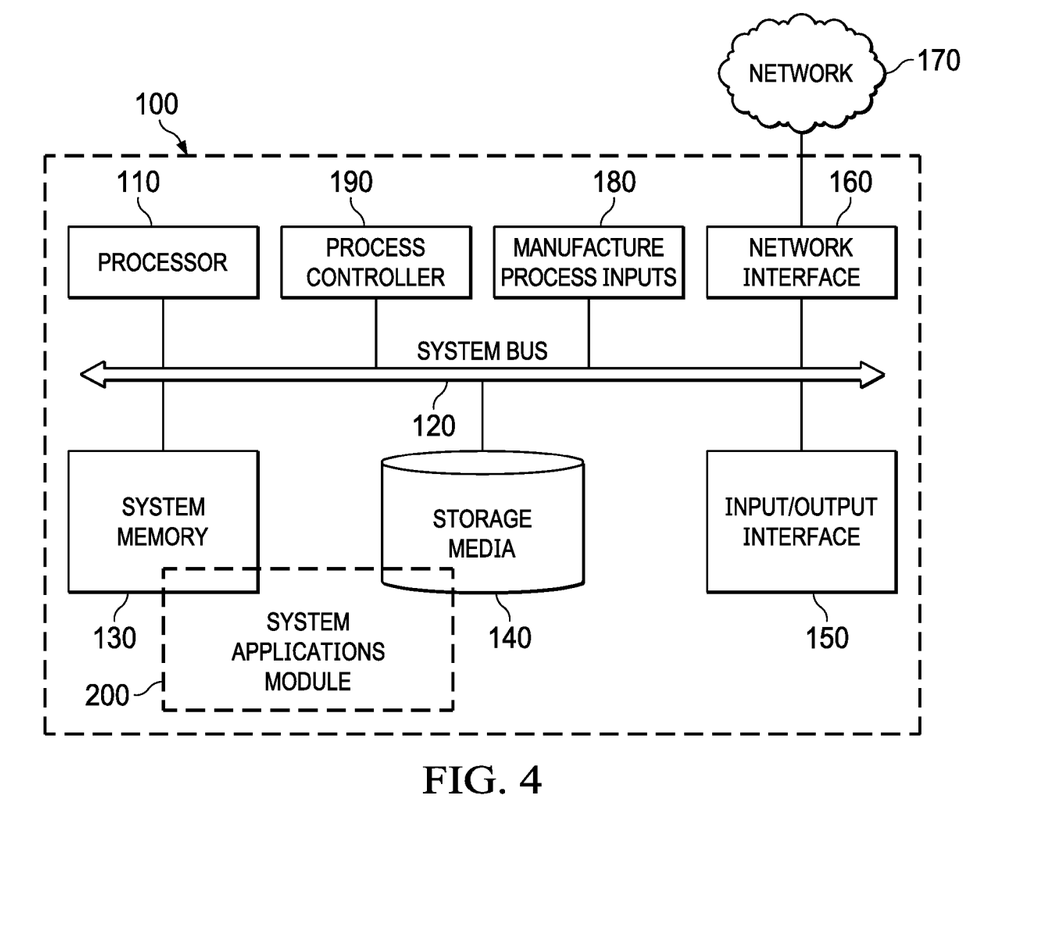
FIG. 4 is a block diagram depicting a computing machine and system applications, in accordance to certain example embodiments.

Referring now to FIG. 4, illustrated is a computing machine 100 and a system applications module 200, in accordance with example embodiments. The computing machine 100 can correspond to any of the various computers, mobile devices, laptop computers, servers, embedded systems, or computing systems presented herein. The module 200 can comprise one or more hardware or software elements, e.g., other OS application and user and kernel space applications, designed to facilitate the computing machine 100 in performing the various methods and processing functions presented herein. The computing machine 100 can include various internal or attached components such as a processor 110, system bus 120, system memory 130, storage media 140, input/output interface 150, and a network interface 160 for communicating with a network 170, e.g., a loopback, local network, wide-area network, cellular/GPS, Bluetooth, WIFI, and WIMAX for receiving manufacture process inputs, and a process controller 180 for processing manufacture process inputs.

The computing machine 100 can be implemented as a conventional computer system, an embedded controller, a laptop, a server, a mobile device, a smartphone, a wearable computer, a customized machine, any other hardware platform, or any combination or multiplicity thereof. The computing machine 100 can be a distributed system configured to function using multiple computing machines interconnected via a data network or bus system.

The processor 110 can be designed to execute code instructions in order to perform the operations and functionality described herein, manage request flow and address mappings, and to perform calculations and generate commands. The processor 110 can be configured to monitor and control the operation of the components in the computing machines. The processor 110 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 110 can be a single processing unit, multiple processing units, a single processing core, multiple processing cores, special purpose processing cores, co-processors, or any combination thereof. According to certain embodiments, the processor 110 along with other components of the computing machine 100 can be a software based or hardware based virtualized computing machine executing within one or more other computing machines.

The system memory 130 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 130 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 130. The system memory 130 can be implemented using a single memory module or multiple memory modules. While the system memory 130 is depicted as being part of the computing machine, one skilled in the art will recognize that the system memory 130 can be separate from the computing machine 100 without departing from the scope of the subject technology. It should also be appreciated that the system memory 130 can include, or operate in conjunction with, a non-volatile storage device such as the storage media 140.

The storage media 140 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 140 can store one or more operating systems, application programs and program modules, data, or any other information. The storage media 140 can be part of, or connected to, the computing machine. The storage media 140 can also be part of one or more other computing machines that are in communication with the computing machine such as servers, database servers, cloud storage, network attached storage, and so forth.

The applications module 200 and other OS application modules can comprise one or more hardware or software elements configured to facilitate the computing machine with performing the various methods and processing functions presented herein. The applications module 200 and other OS application modules can include one or more algorithms or sequences of instructions stored as software or firmware in association with the system memory 130, the storage media 140 or both. The storage media 140 can therefore represent examples of machine or computer readable media on which instructions or code can be stored for execution by the processor 110. Machine or computer readable media can generally refer to any medium or media used to provide instructions to the processor 110. Such machine or computer readable media associated with the applications module 200 and other OS application modules can comprise a computer software product. It should be appreciated that a computer software product comprising the applications module 200 and other OS application modules can also be associated with one or more processes or methods for delivering the applications module 200 and other OS application modules to the computing machine via a network, any signal-bearing medium, or any other communication or delivery technology. The applications module 200 and other OS application modules can also comprise hardware circuits or information for configuring hardware circuits such as microcode or configuration information for an FPGA or other PLD. In one exemplary embodiment, applications module 200 and other OS application modules can include algorithms capable of performing the functional operations described by the flow charts and computer systems presented herein.

The input/output ("I/O") interface 150 can be configured to couple to one or more external devices, to receive data from the one or more external devices, and to send data to the one or more external devices. Such external devices along with the various internal devices can also be known as peripheral devices. The I/O interface 150 can include both electrical and physical connections for coupling the various peripheral devices to the computing machine or the processor 110. The I/O interface 150 can be configured to communicate data, addresses, and control signals between the peripheral devices, the computing machine, or the processor 110. The I/O interface 150 can be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 150 can be configured to implement only one interface or bus technology. Alternatively, the I/O interface 150 can be configured to implement multiple interfaces or bus technologies. The I/O interface 150 can be configured as part of, all of, or to operate in conjunction with, the system bus 120. The I/O interface 150 can include one or more buffers for buffering transmissions between one or more external devices, internal devices, the computing machine, or the processor 120.

The I/O interface 120 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 120 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 100 can operate in a networked environment using logical connections through the NIC 160 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 110 can be connected to the other elements of the computing machine or the various peripherals discussed herein through the system bus 120. It should be appreciated that the system bus 120 can be within the processor 110, outside the processor 110, or both. According to some embodiments, any of the processors 110, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a process control tool for processing wide data from automated manufacturing operations: a feature selector configured to: receive process input data from at least one manufacturing process application, wherein the process input data includes a plurality of observations and associated variables; convert identified categorical variables into numerical variables and identified time-series data into fixed numbers of intervals; and compute statistics that measure the strengths of relationships between predictor values and an outcome variable; an analysis server configured to: perform at least one operation to identify interactions between predictor values; a visualization engine configured to display the interactions for use in managing the manufacturing operations;

Clause 2, the process control tool of clause 1 wherein the feature selector is further configured to convert the received process input data to a stacked format having one row for each variable in each observation;

Clause 3, the process control tool of clause 1 wherein the identified categorical variables are converted into numerical variables using an impact-coding technique;

Clause 4, the process control tool of clause 2 wherein the feature selector is further configured to: order the predictor values based on the computed statistics; filter the predictor values to a subset of predictor values based on a threshold value; and pivot the subset into a wide format;

Clause 5, the process control tool of clause 4 wherein the analysis server is configured to: receive the pivoted subset of predictor values; and perform at least one of maximum Likelihood computations and pre-defined searches to identify interactions between the predictor values in the sub set;

Clause 6, the process control tool of clause 1 wherein the analysis server is further configured to operate in at least one of in-memory, in-virtual-memory, and multithreaded computations;

Clause 7, the process control tool of clause 1 wherein the feature selector and the analysis server work concurrently and asynchronously;

Clause 8, the process control tool of clause 1 wherein the analysis server is a dedicated analysis server;

Clause 9, the process control tool of clause 1 wherein the process input data is characterized as having a wide data set or a wide and big data set;

Clause 10, a method of processing wide data from automated manufacturing operations, the method comprising: receive process input data from at least one manufacturing process application, wherein the process input data includes a plurality of observations and associated variables; converting identified categorical variables into numerical variables and identified time-series data into fixed numbers of intervals; and computing statistics that measure the strengths of relationships between predictor values and an outcome variable; performing at least one operation to identify interactions between predictor values; and displaying the interactions for use in managing the manufacturing operations;

Clause 11, the method of clause 10 further comprising converting the received process input data to a stacked format having one row for each variable in each observation;

Clause 12, the method of clause 10 further comprises converting the identified categorical variables into numerical variables using an impact-coding technique;

Clause 13, the method of clause 11 further comprising: ordering the predictor values based on the computed statistics; filtering the predictor values to a subset of predictor values based on a threshold value; and pivoting the subset into a wide format;

Clause 14, the method of clause 13 further comprising: receiving the pivoted subset of predictor values; and performing at least one of maximum Likelihood computations and pre-defined searches to identify interactions between the predictor values in the subset;

Clause 15, a non-transitory computer readable storage medium comprising a set of computer instructions executable by a processor for processing wide data from automated manufacturing operations, the computer instructions configured to: receive process input data from at least one manufacturing process application, wherein the process input data includes a plurality of observations and associated variables;

convert identified categorical variables into numerical variables and identified time-series data into fixed numbers of intervals; and compute statistics that measure the strengths of relationships between predictor values and an outcome variable; perform at least one operation to identify interactions between predictor values; display the interactions for use in managing the manufacturing operations;

Clause 16, the non-transitory computer readable storage medium as recited in clause 15 further including computer instructions configured to convert the received process input data to a stacked format having one row for each variable in each observation;

Clause 17, the non-transitory computer readable storage medium as recited in clause 15 further including computer instructions configured to use an impact-coding technique to convert the identified categorical variables into numerical variables;

Clause 18, the non-transitory computer readable storage medium as recited in clause 16 further including computer instructions configured to: order the predictor values based on the computed statistics; filter the predictor values to a subset of predictor values based on a threshold value; pivot the subset into a wide format; and perform at least one of maximum Likelihood computations and pre-defined searches to identify interactions between the predictor values in the sub set;

Clause 19, the non-transitory computer readable storage medium as recited in clause 15 further including computer instructions configured wherein the analysis server is further configured to perform at least one operation to identify interactions between predictor values and the at least one outcome variable in at least one of in-memory, in-virtual-memory, and multithreaded computations; and Clause 20, the non-transitory computer readable storage medium as recited in clause 15 wherein a subset of the instructions operate concurrently with and asynchronously from another subset of the instructions.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A process control tool for processing wide data from automated manufacturing operations, the process control tool comprising:
a feature selector configured to:
receive process input data from at least one manufacturing process application, wherein the process input data includes a plurality of observations and associated variables;
convert identified categorical variables into numerical variables and identified time-series data into fixed numbers of intervals; and
an analysis server configured to:
perform at least one operation to identify interactions between predictor values;
receive a subset of the predictor values; and
perform at least one of a statistical and modeling operation and pre-defined searches to identify interactions between the predictor values in the subset; and
a visualization engine configured to display the interactions for use in managing the manufacturing operations;
wherein the categorical variables are converted into the numerical variables by randomly dividing the categorical variables into two random samples, separately and individually computing an average for each category in each categorical variable, and replacing the categorical variables in each random sample with a computed average for the categorical variables in the other random sample;
wherein the categorial variables are discrete variables and the numerical variables are continuous variables.

2. The process control tool of claim 1 wherein the feature selector is further configured to convert the received process input data to a stacked format having one row for each variable in each observation.

3. The process control tool of claim 1 wherein the identified categorical variables are converted into numerical variables using an impact-coding technique.

4. The process control tool of claim 2 wherein the feature selector is further configured to:
order the predictor values based on the computed statistics;
filter the predictor values to the subset of predictor values based on a threshold value; and
pivot the subset into a wide format wherein each variable is expressed with its own column in a tabular dataset.

5. The process control tool of claim 4,
wherein the statistical and modeling operations includes at least one of regression algorithms, neural networks, deep-learning networks, and recursive partitioning algorithms.

6. The process control tool of claim 1 wherein the analysis server is further configured to operate in at least one of in-memory, in-virtual-memory, and multithreaded computations.

7. The process control tool of claim 1 wherein the feature selector and the analysis server work concurrently and asynchronously.

8. The process control tool of claim 1 wherein the analysis server is a dedicated analysis server.

9. The process control tool of claim 1 wherein the process input data is characterized as having a wide data set or a wide and big data set.

10. A method of processing wide data from automated manufacturing operations, the method comprising:
receive process input data from at least one manufacturing process application, wherein the process input data includes a plurality of observations and associated variables;
converting identified categorical variables into numerical variables and identified time-series data into fixed numbers of intervals;

computing statistics that measure the strengths of relationships between predictor values and an outcome variable;
performing at least one operation to identify interactions between predictor values;
receiving a subset of the predictor values;
performing at least one of a statistical and modeling operation and pre-defined searches to identify interactions between the predictor values in the subset; and
displaying the interactions for use in managing the manufacturing operations;
wherein converting the categorical variables into the numerical variables comprises:
randomly dividing the categorical variables into two random samples;
separately and individually computing an average for each category in each categorical variable; and
replacing the categorical variables in each random sample with a computed average for the categorical variables in the other random sample;
wherein the categorial variables are discrete variables and the numerical variables are continuous variables.

11. The method of claim 10 further comprising converting the received process input data to a stacked format having one row for each variable in each observation.

12. The method of claim 10 further comprises converting the identified categorical variables into numerical variables using an impact-coding technique.

13. The method of claim 11 further comprising:
ordering the predictor values based on the computed statistics;
filtering the predictor values to the subset of predictor values based on a threshold value; and
pivoting the subset into a wide format.

14. The method of claim 13 further comprising:
performing at least one of maximum Likelihood computations and pre-defined searches to identify interactions between the predictor values in the subset.

15. A non-transitory computer readable storage medium comprising a set of computer instructions executable by a processor for processing wide data from automated manufacturing operations, the computer instructions configured to:
receive process input data from at least one manufacturing process application, wherein the process input data includes a plurality of observations and associated variables;
convert identified categorical variables into numerical variables and identified time-series data into fixed numbers of intervals;
compute statistics that measure the strengths of relationships between predictor values and an outcome variable;
perform at least one operation to identify interactions between predictor values;
receive a subset of predictor values; and
perform at least one of a statistical and modeling operation and pre-defined searches to identify interactions between the predictor values in the subset; and
display the interactions for use in managing the manufacturing operations;
wherein the categorical variables are converted into the numerical variables by randomly dividing the categorical variables into two random samples, separately and individually computing an average for each category in each categorical variable, and replacing the categorical variables in each random sample with a computed average for the categorical variables in the other random sample;
wherein the categorial variables are discrete variables and the numerical variables are continuous variables.

16. The non-transitory computer readable storage medium as recited in claim 15 further including computer instructions configured to convert the received process input data to a stacked format having one row for each variable in each observation.

17. The non-transitory computer readable storage medium as recited in claim 15 further including computer instructions configured to use an impact-coding technique to convert the identified categorical variables into numerical variables.

18. The non-transitory computer readable storage medium as recited in claim 16 further including computer instructions configured to:
order the predictor values based on the computed statistics;
filter the predictor values to the subset of predictor values based on a threshold value;
pivot the subset into a wide format; and
perform at least one of maximum Likelihood computations and pre-defined searches to identify interactions between the predictor values in the subset.

19. The non-transitory computer readable storage medium as recited in claim 15 further including computer instructions configured wherein the analysis server is further configured to perform at least one operation to identify interactions between predictor values and the at least one outcome variable in at least one of in-memory, in-virtual-memory, and multithreaded computations.

20. The non-transitory computer readable storage medium as recited in claim 15 wherein a subset of the instructions operate concurrently with and asynchronously from another subset of the instructions.

* * * * *